INVENTOR
F. W. W. MORLEY
BY
Wilkinson & Mawhinney
ATTYS.

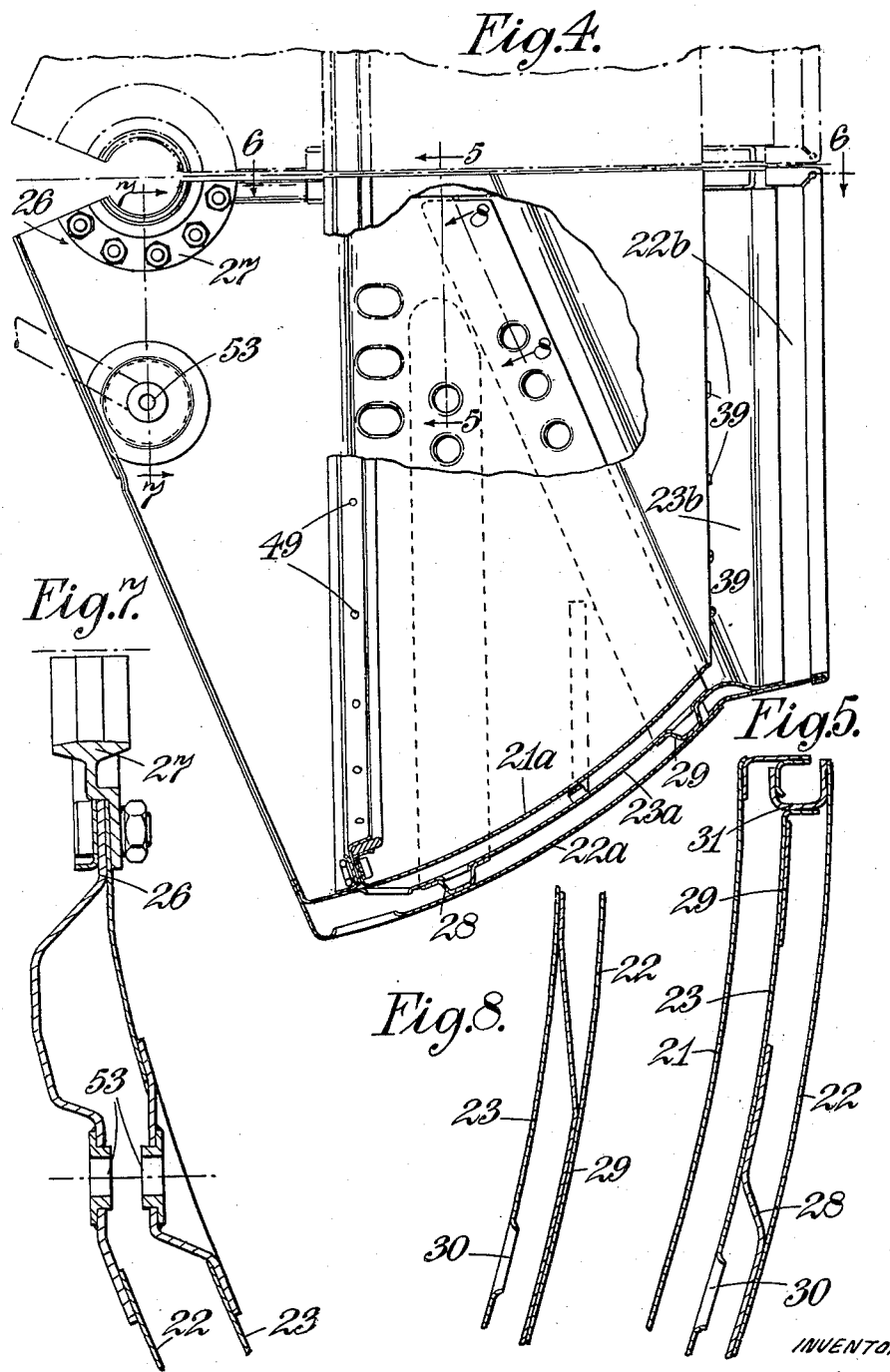

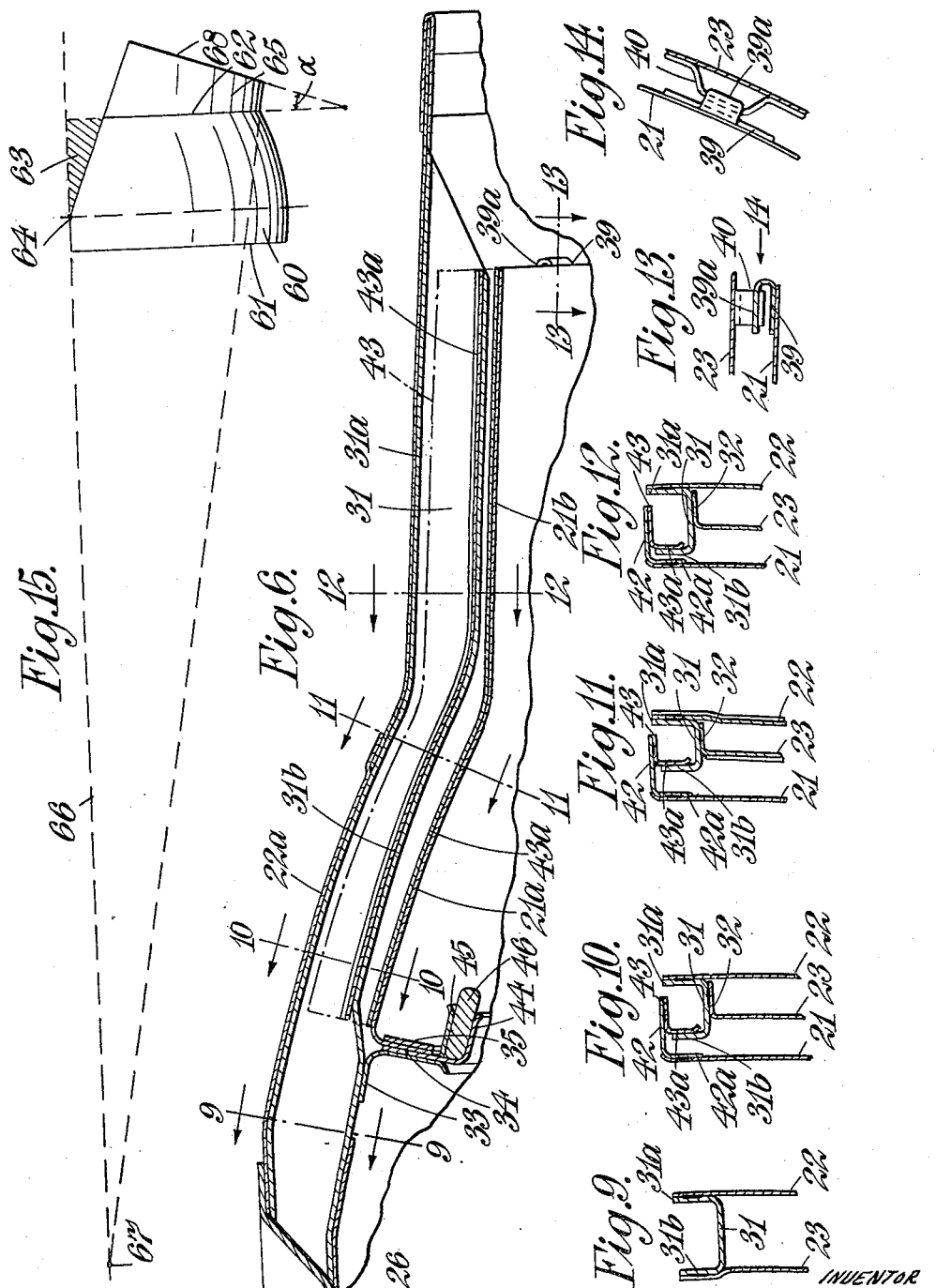

United States Patent Office 2,839,890
Patented June 24, 1958

2,839,890
VARIABLE AREA JET NOZZLES FOR GAS TURBINE UNITS

Frederick William Walton Morley, Castle Donington, England, assignor to Rolls-Royce Limited, Derby, England, a British company Application June 15, 1953, Serial No. 361,775

Claims priority, application Great Britain June 18, 1952

7 Claims. (Cl. 60—35.6)

This invention relates to jet nozzles for gas-turbine propulsion units such, for example, as are used on aircraft, and has for an object to provide an improved construction of jet nozzle of the kind having adjustable nozzle portions for varying the orifice area of the nozzle.

This invention comprises improvements in or modifications of jet nozzles for gas-turbine units of the kind referred to such as are described and claimed in U. S. A. Patent No. 2,699,645, granted January 18, 1955, G. Oulianoff et al. assignors to Rolls-Royce Limited.

In the specification of U. S. A. Patent No. 2,699,645, granted January 18, 1955, there is described and claimed a jet nozzle arrangement for a gas-turbine propulsion unit comprising a plurality of nozzle-portions pivotally mounted on the nozzle end of a jet-pipe and arranged for adjustment to vary the orifice area of the nozzle, which nozzle-portions are formed internally with passages having inlets thereto and outlets therefrom, the inlets and outlets being located in the nozzle-portions so that the passage of hot gases through the nozzle orifice induces a flow of cooling air through the passages in the nozzle-portions. In a construction of jet nozzle as described in this specification each adjustable nozzle-portion is formed as a hollow sheet metal structure having a part-spherical inner wall, a part spherical outer wall spaced away from the inner wall and arcuate leading and trailing end walls connecting the inner and outer walls, and each nozzle-portion is provided with apertures in its leading and trailing end walls to provide the inlets and outlets. Moreover in the construction of jet nozzle described in specification of U. S. A. Patent No. 2,699,645, granted January 18, 1955, the jet-pipe is formed with a double skin with the outer skin spaced from the inner skin, and the nozzle-portions are arranged to be accommodated between the skins and to project from the space between them to a varying extent according to their position of adjustment in varying the nozzle orifice area, and the air inlets to the nozzle-portions are located in the space between the skins so that in one position at least of the nozzle-portions the cooling air flowing through them flows through the space between the skins. In the construction described in the specification there is also provided sealing means operative between the adjustable nozzle-portions and the jet-pipe skins, the sealing means being arranged so that in the fully extended position of the nozzle-portions (in which the orifice area is a minimum) the cooling air flow through the space between the jet pipe skins is constrained to pass through the nozzle-portions.

It has been found in use of jet nozzles as described and claimed in U. S. A. Patent No. 2,699,645, granted January 18, 1955, that damage may occur to the nozzle-portions due to the differences in expansion between the inner and outer walls of the nozzle-portions and this invention has for an object to avoid this difficulty.

According to the present invention, in a jet nozzle arrangement as claimed in U. S. A. Patent No. 2,699,645, granted January 18, 1955, each of the nozzle-portions is constructed from sheet metal to have radially-spaced walls which are arranged so that the inner wall of the nozzle-portion is free to expand relative to the outer wall of the nozzle portion.

According to a feature of this invention, each nozzle-portion may have the portion of the innermost wall which in use is in direct contact with the hot exhaust gases flowing through the nozzle orifice attached to the remainder of the nozzle-portion solely by its leading edge so as to be free to expand axially of the nozzle orifice relative to the remainder of the nozzle portion. In such a construction the lateral edges of the inner wall may be formed with channels to inter-engage with channels at the lateral edges of the remainder of the nozzle portion. In such a construction moreover the remainder of the nozzle-portion may comprise a plurality of sheet metal walls spaced apart and the air passages extending through the nozzle portions are preferably so arranged that the cooling air flows between the inner wall which is free for axial expansion and the innermost wall of the remainder of the nozzle-portion, and the outlet from the nozzle-portion may be afforded by the part-annular aperture formed between the trailing edges of the inner wall and the remainder of the nozzle-portion.

According to another feature of this invention, the trailing edge of the inner wall of the nozzle-portion may be supported from the trailing edge of the remainder of the nozzle-portion by providing hooked tabs on the one part of extend axially through loops attached to the other part. Preferably the hooked tabs are secured to the inner wall and are arranged to engage with the loops when the inner wall is brought into position to be secured by its leading edge to the remainder of the nozzle-portion.

One embodiment of this invention will now be described by way of example, the description referring to the accompanying drawings in which:

Figure 3 is an outside view of one part of the nozzle,

Figure 4 is a view corresponding to Figure 3 with parts broken away,

Figure 5 is a section on the line 5—5 of Figure 4,

Figure 6 is a section on the line 6—6 of Figure 4,

Figure 7 is a section on the line 7—7 of Figure 4,

Figure 8 is a section on the line 8—8 of Figure 4,

Figures 9 to 13 are local sections on the lines 9—9, 10—10, 11—11, 12—12, 13—13 respectively of Figure 6, Figure 14 is a view along the arrow 14 of Figure 13, and, Figure 15 illustrates the geometry of construction of parts of the nozzle.

Figure 1:
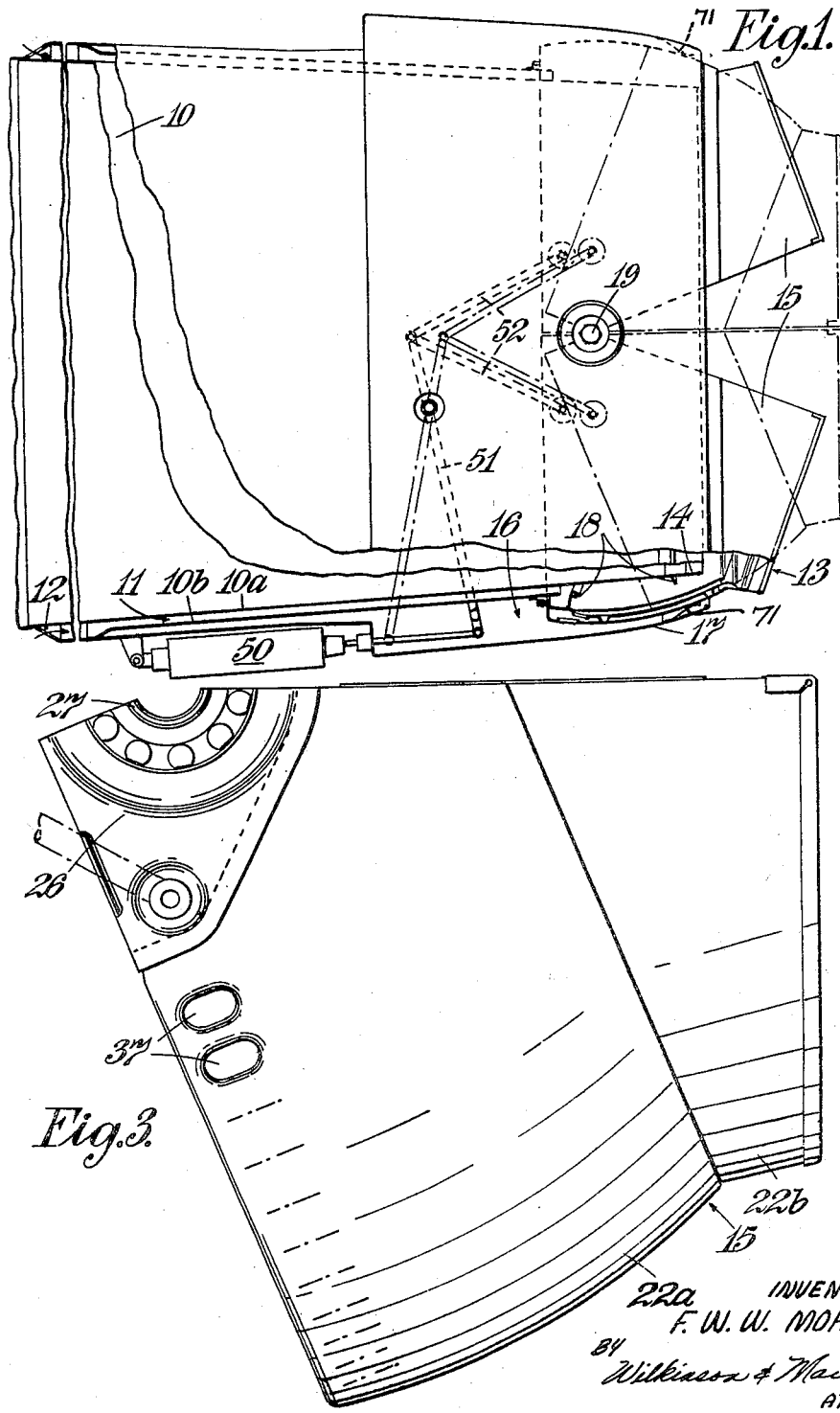
Figure 1 is a diagrammatic view of a jet pipe and variable area nozzle.

Referring first to Figure 1, the jet-pipe 10 is of the type having multiple walls 10a, 10b to afford an annular cooling air passage 11 extending from inlets 12 at a point intermediate the length of the jet-pipe to adjacent the outlet nozzle 13 of the jet-pipe, the fixed area of which is determined by an end fitting 14 of frusto-conical form (see also Figure 2) at the ultimate outlet of the jet-pipe 10.

The effective area of the outlet orifice is arranged to be varied between the area determined by the end fitting 14 (as the maximum effective area) and a minimum effective area, by a pair of adjustable nozzle-portions 15 mounted at the end of the jet-pipe 10 to swing about a common axis formed by a horizontal diameter thereof, so that each nozzle-portion 15 extends substantially halfway around the jet-pipe.

The nozzle-portions 15 are conveniently supported in trunnion mountings 19 accommodated in an annular chamber 16 formed by a wall 17 outside the downstream end of the annular air passage 11, and the trunnion mountings are conveniently supported on this wall 17 thereby to be substantially unaffected by the temperature experienced by the inner wall 10a of the jet-pipe 10.

Figure 2:
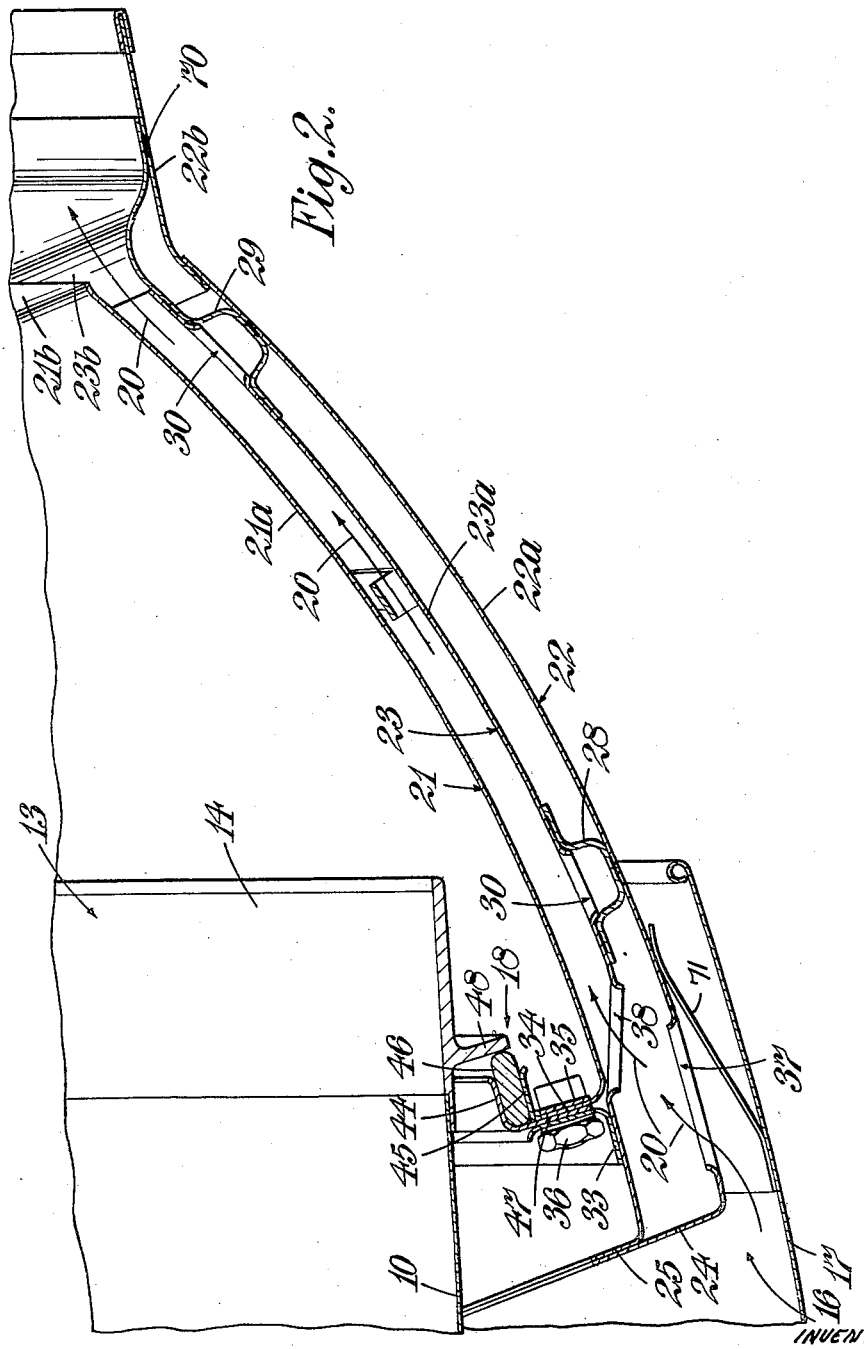
Figure 2 is part of Figure 1 to a larger scale and in more detail.

Each nozzle-portion 15 is arranged to have air passages running through it so that the cooling air flowing through the annular air passage 11 formed between the walls 10a, 10b of the jet-pipe can also flow through the nozzle-portions 15, and sealing means 18 is provided so that the cooling air is constrained to flow from the passage 11 into the chamber 16 and then as indicated by arrows 20 through the nozzle-portions 15 when they are extended to define the minimum effective area of the nozzle orifice (Figure 2). When the nozzle-portions 15 are retracted so that the nozzle orifice area is defined by the end fitting 14 on the end of the inner wall of the jet-pipe 10, the cooling air from the annular passage 11 is conveniently allowed to flow along the inner surface of the inner wall of the nozzle-portions 15 so as to insulate the nozzle-portions from the hot exhaust jet. There is also provided second gas-sealing means (see Figures 1 and 2) between the outer surfaces of the outermost walls of the nozzle portions 15 and the outer wall 17 of the annular chamber 16. This gas-sealing means is in the form of a springy sealing strip 71 extending around the nozzle, the strip being attached to the wall 17 by one edge and being in sliding contact at its other edge with the outer surfaces of the nozzle portions 15.

A ram 50 (Figure 1) is provided for rocking the nozzle portions 15 and is located outside the wall 17. The ram rocks a lever arrangement 51 having links 52 to the nozzle-portions 15 radially outside the trunnions 19.

In this construction, each nozzle-portion 15 comprises three walls, an inner wall 21, an outer wall 22 and a central wall 23 (Figure 2). The outer wall 22 and central wall 23 are secured together to form a box-like load-bearing structure of the nozzle-portion 15 and the inner wall 21 is secured at its leading edge to the load-bearing structure and is free to expand axially thereof to accommodate differences in expansion due to the inner wall 21 being in direct contact with the hot exhaust gases. Each of these walls comprises a part-spherical portion 21a, 22a, 23a and a part frusto-conical portion 21b, 22b, 23b. The part-spherical portions 21a, 22a, 23a are concentric with one another and it is arranged that the trunnion axis of the nozzle-portions 15 is a common diameter of the part-spherical portions. The part frusto-conical portions 21b, 22b, 23b are co-axial and nested. The purpose of this formation will be described below.

The outer wall 22 and central wall 23 forming the box-like load-bearing structure are connected together at their leading edges by being formed with inward flanges 24, 25 respectively (Figures 2 and 4) and by these flanges being spot-welded together. These walls 22, 23 adjacent their lateral edges are deformed at 26 into contact (Figures 2, 3, 4, 6 and 7) and welded together, and a part-circular cutaway is formed in the contacting portions to receive a part annular bearing member 27 of the trunnion mounting which member is conveniently bolted in position. The central wall 23 and outer wall 22 are held in spaced relation by circumferentially extending channel section stiffener members 28, 29 which lie between the walls 22, 23 and are spot-welded thereto at a number of points. A series of apertures 30 are formed in the central wall 23 to open into the channels of the stiffener members 28, 29 to facilitate the welding of the stiffener members to the outer wall 22. As shown, the channel section stiffener member 29 is positioned adjacent the trailing edges of the part-spherical portions 22a, 23a, of the walls 22, 23 and the member 28 is positioned intermediate the leading and trailing edges of the walls and located in a plane (see Figure 4) such that when the nozzle-portions 15 are fully extended it is parallel to the plane of the end fitting 14 of the jet-pipe 10. The trailing edges of the outer wall 22 and central wall 23 are deformed to bring them together and are spot-welded together as indicated at 70 over their contacting parts.

The walls 22, 23 are also fitted with aligned bushes 53 to receive a pivot pin by which the corresponding link 52 is connected to the nozzle-portion 15.

The lateral edges of the central and outer walls 23, 22 are maintained in spaced relation, by channel-sectioned edge pieces 31 which are located with their channels to face the adjacent lateral edge of the adjacent nozzle-portion 15. The outer wall 22 has its lateral edges spot-welded to one side flange 31a of the channel-sectioned edge piece 31 and the lateral edge of the central wall 23 has an outward flange 32 welded to the base of the channel-sectioned edge piece 31 except adjacent the deformation 26 where the edge is welded to the other side flange 31b of the edge piece 31 (Figure 9).

The central wall 23 has welded to it an angle-sectioned member 33 which is arranged in a plane so that with the nozzle-portion 15 in the fully extended position (Figure 2) it lies in a plane parallel to the plane of the end fitting 14 of the jet-pipe 10 and slightly forwards thereof. This angle-sectioned member 33 is employed to retain the leading edge of the inner wall 21 in position, which leading edge has an inward flange 34 stiffened by a strip 35 of metal and secured to the angle-sectioned member 33 by means of a number of circumferentially spaced bolts 36. The angle-sectioned member 33 may also support a sealing element described below which may be secured in position by the same bolts 36.

The inner wall 21 extends rearwardly from the angle-sectioned member 33 in spaced relation to the central wall 23 so as to leave an air passage between these walls, there being inlets to the passage formed by circumferentially spaced apertures 37, 38 in the outer wall 22 and central wall 23 respectively adjacent their leading edges and an outlet from the passage formed by the part-annular space between the trailing edges of the inner and central walls 21, 23.

The trailing edge of the inner wall 21 has secured to it as by welding a number of circumferentially spaced hooked tabs 39 (Figures 6, 13 and 14), the fingers 39a of the hooks extending forwards and axially of the nozzle. The hooked tabs 39 slidingly engage by their fingers 39a with the circumferentially spaced loops formed by channel sectional tabs 40 welded to the inner surface of the central wall 23, and the hooked tabs 39 engage the looped tabs 40 when the inner wall 21 is brought in position to be secured to the angle-sectioned member 33 above referred to. The hooked tabs 39 however leave the trailing edge of the inner wall 21 free to expand rearwards relative to the central wall 23.

Each lateral edge of the inner wall 21 has secured to it as by welding an F-sectioned part which is conveniently made up by welding together two angle strips 42, 43 over flanges of different length (Figures 6, 10, 11 and 12). The F-sectioned part is secured to the edge by its top flange 42a and extends outwardly from the outer surface of the inner wall. This F-sectioned part engages by a second flange 43a the channel edge pieces 31 which join the edges of the outer wall 22 and central wall 23 and act as edge guides for the inner wall 21 to retain it properly located in a circumferential direction.

The sealing means 18 which includes the sealing element above referred to may be of strip form and comprise a pair of axially-directed flanges 44, 45 between which is positioned a length of braided metal 46, and a substantially radial flange 47 by which the sealing element is secured in position. One edge of the length of braided metal 46 may project from between the pair of flanges 44, 45 to come into contact with an outward flange 48 on the end fitting 14 when the nozzle-portions 15 are moved to the position (Figure 2) in which they define the minimum area of the orifice. The length of braided metal may be retained in position by rivets 49

(Figure 4) passing through the axially-directed flanges 44, 45.

The part-spherical portions 21a, 22a, 23a and part frusto-conical portions 21b, 22b, 23b of the walls are so arranged that when the nozzle-segments 15 are in the minimum area position the ultimate outlet is contained in a single plane (Figures 1 and 4).

Referring now to Figure 15, there is illustrated a convenient geometrical layout for the walls 21, 22, 23.

The part spherical portion of each of the walls 21, 23 is substantially a half equatorial zone of a sphere 60 whereof the planes containing the upstream and downstream limits 61, 62 are parallel and whereof the downstream limit 62 is of less diameter than the upstream limit 61; the circumferential ends of the half zone are cut away as indicated by the hatching 63 from the downstream limit 62 to the swinging axis 64 to permit the half zones to swing towards one another. The end planes of the part spherical portion 21a are inclined so that it tapers towards its circumferentially-spaced ends.

The part frusto-conical portion 65 of each wall is approximately a half frustum of a cone the axis of generation 66 of which passes through the centre of the sphere, and the edge of one of its ends (the end nearer the apex 67 of the cone from which the portion is derived) is contained in a plane at right angles to the axis 66 of the cone and is of a diameter to coincide with the downstream limit 62 of the half zone. The edge 68 of the free end of the part frusto-conical portion 65 is contained in a plane which makes an angle α to the normal to the axis of the cone equal to the angle between the jet-pipe axis and the cone axis when the nozzle-segment is fully extended and which is such that when the nozzle-segment is fully extended the plane is at right angles to the jet-pipe axis. The frusto-conical portion 65 is cut-away as a continuation of the cutaways 63 of the half zone of the sphere and thus, in the fully extended position, the adjacent edges of the nozzle-segments 15 are substantially in contact.

The wall 21 is similar but its upstream limit is parallel to the downstream edge of its frusto-conical portion.

The half zones of the outer, central and inner walls have substantially equal axial extents, and whereas the frusto-conical portion of the inner wall 21 has only a small axial extent at its mid point, the frusto-conical portions of the central and outer walls have a substantial axial length at their mid points so that, when the walls are arranged in spaced relation to form a nozzle-segment, the part frusto-conical portions of the outer and central walls afford a lip projecting beyond the inner wall. The semi-cone angles, which may for example be about 10°, and axial extent are selected however so that the downstream edge of the inner wall defines the nozzle area when the segments are fully extended. With this arrangement and with the nozzle-segments fully extended, the nozzle aperture as seen axially of the jet-pipe has an elliptical form.

I claim:

1. A jet nozzle arrangement for a gas-turbine propulsion unit comprising a jet pipe having an inner skin and an outer skin member surrounding said inner skin so as to afford therebetween an annular space having an air inlet thereto; a nozzle at the outlet end of said jet pipe comprising a plurality of nozzle portions adapted to define a nozzle orifice and accommodated in part in said annular space and mounted on the outlet end of said jet pipe, each of said nozzle portions comprising a load-bearing structure which comprises a plurality of radially-spaced, sheet metal walls rigidly secured together, and an inner sheet metal wall radially spaced inwardly from said load-bearing structure to afford an air passage between said load-bearing structure and said inner wall, there being inlet-defining means communicating with said annular space and opening into said air passage adjacent a wall of the load-bearing structure and there being also outlet-defining means for said air passage so located in the nozzle portions that the flow of hot gases through the nozzle orifice induces a flow of cooling air through said air passage between the load-bearing structure and the inner wall, said inner wall being rigidly secured along one edge to the load-bearing structure and having a second edge thereof in sliding engagement with the load-bearing structure to be free to expand relative to the load-bearing structure; means for adjustably moving said nozzle portions to vary the orifice area of the nozzle; first co-operating gas-sealing means on said nozzle portions and said inner skin arranged at least in the position of said nozzle portions defining a minimum orifice area to prevent leakage air flow between the inner surfaces of the inner walls of said nozzle portions and the inner skin of the jet pipe and second gas-sealing means co-operating between the outer skin member of the jet pipe and the outer surfaces of the load-bearing structures of the nozzle portions at least in said minimum orifice area defining position of the nozzle portions.

2. A jet nozzle arrangement as claimed in claim 1, wherein each nozzle portion has its inner wall bolted to the remainder of the nozzle portion along said one edge thereof, and the remaining edges of the inner wall slidingly interengage with the remainder of the nozzle portion to be capable of expanding freely.

3. A jet nozzle arrangement as claimed in claim 1, wherein the load-bearing structure of the nozzle portion has channel members rigidly connecting together the lateral edges of its radially-spaced walls and the said inner wall carries at its lateral edges channel-forming members slidingly engaging the channel members at the edges of the load-bearing structure.

4. A jet nozzle arrangement as claimed in claim 3, wherein the outlet from the air passage in the nozzle portion is afforded by a part-annular gap between the downstream edge of the innermost wall and the inner surface of the adjacent wall of the load-bearing structure.

5. A jet nozzle arrangement as claimed in claim 4, wherein the trailing edge of the innermost wall of the nozzle portion is connected with the load-bearing structure of the nozzle portion by the provision of hooked tabs on the one part to extend axially through loops attached to the other part.

6. A jet nozzle arrangement as claimed in claim 5, wherein the hooked tabs are secured to the innermost wall of the nozzle portion and have forwardly-extending fingers whereby the fingers engage in the loops when the innermost wall is brought into a position to be secured by its leading edge to the load-bearing structure of the nozzle portion.

7. A jet nozzle arrangement for a gas-turbine propulsion unit as claimed in claim 1, wherein said second gas-sealing means comprises a sealing member mounted on said outer skin member and slidingly co-operating with the outer surfaces of the outermost walls of the radially-spaced walls of the nozzle portions.

References Cited in the file of this patent

UNITED STATES PATENTS

| | | |
|---|---|---|
| 2,547,619 | Buckland | Apr. 3, 1951 |
| 2,592,060 | Oulianoff | Apr. 8, 1952 |
| 2,603,060 | Brown | July 15, 1952 |
| 2,625,008 | Crook | Jan. 13, 1953 |
| 2,630,673 | Woll | Mar. 10, 1953 |
| 2,635,419 | Ambrose | Apr. 21, 1953 |
| 2,699,645 | Oulianoff et al. | Jan. 18, 1955 |
| 2,722,801 | Lombard | Nov. 8, 1955 |